United States Patent
Viikari et al.

(10) Patent No.: US 7,366,523 B2
(45) Date of Patent: *Apr. 29, 2008

(54) METHOD AND SYSTEM FOR PROVIDING LOCATION-BASED SERVICES

(75) Inventors: Jere Viikari, Tampere (FI); Antti Forstadius, Tampere (FI)

(73) Assignee: Nokia Corporation, Espoo (FI)

( * ) Notice: Subject to any disclaimer, the term of this patent is extended or adjusted under 35 U.S.C. 154(b) by 430 days.

This patent is subject to a terminal disclaimer.

(21) Appl. No.: 10/291,567

(22) Filed: Nov. 12, 2002

(65) Prior Publication Data

US 2004/0092271 A1 May 13, 2004

(51) Int. Cl.
*H04Q 7/20* (2006.01)

(52) U.S. Cl. .............. 455/456.1; 455/404.2; 455/414.2; 455/457; 342/357.01

(58) Field of Classification Search ........... 455/456.1, 455/404.2, 414.2, 414.3, 457; 342/357.01; 340/539.13
See application file for complete search history.

(56) References Cited

U.S. PATENT DOCUMENTS

| | | | |
|---|---|---|---|
| 6,115,754 A | 9/2000 | Landgren .................. 709/249 |
| 6,119,014 A | 9/2000 | Alperovich et al. | |
| 6,141,335 A | 10/2000 | Kuwahara et al. | |
| 6,215,779 B1 * | 4/2001 | Bender et al. ............... 370/338 |
| 6,239,744 B1 | 5/2001 | Singer et al. | |
| 6,256,498 B1 | 7/2001 | Ludwig ...................... 455/433 |
| 6,259,405 B1 * | 7/2001 | Stewart et al. ............... 342/457 |
| 6,327,535 B1 | 12/2001 | Evans et al. ................ 701/300 |
| 6,351,654 B1 | 2/2002 | Huang et al. | |
| 6,370,378 B1 * | 4/2002 | Yahagi ........................ 455/433 |
| 6,526,275 B1 * | 2/2003 | Calvert ........................ 455/418 |
| 6,625,438 B2 * | 9/2003 | Hanson ...................... 455/405 |
| 6,738,630 B2 * | 5/2004 | Ashmore ................ 455/456.3 |
| 6,744,753 B2 * | 6/2004 | Heinonen et al. ........... 370/338 |
| 6,754,470 B2 * | 6/2004 | Hendrickson et al. ... 455/67.11 |
| 6,778,518 B2 * | 8/2004 | Jesse et al. ................ 370/338 |
| 6,799,032 B2 | 9/2004 | McDonnell et al. | |
| 6,999,779 B1 | 2/2006 | Hashimoto | |
| 7,027,821 B2 | 4/2006 | Rehkopf | |
| 2002/0090957 A1 | 7/2002 | Harris | |
| 2002/0095570 A1 | 7/2002 | Eldridge et al. ............ 713/155 |
| 2002/0103936 A1 | 8/2002 | Jano et al. | |

(Continued)

FOREIGN PATENT DOCUMENTS

EP     1 130 933 A1     9/2001

(Continued)

OTHER PUBLICATIONS

The Bluetooth Special Interest Group, Specification of The Bluetooth System, vol. 1 & vol. 2, Core and Profiles: Version 1.1, Feb. 22, 2001.

(Continued)

*Primary Examiner*—Nghi H. Ly
(74) *Attorney, Agent, or Firm*—Morgan & Finnegan L.L.P.

(57) ABSTRACT

A resource request that is originated by a short-range wireless communications device originates a request. A location indicator is added to the resource request that identifies a location of the WCD. The location indicator is based on a location of an access point that forwarded the resource request. Then, the resource request is forwarded to a content server.

52 Claims, 10 Drawing Sheets

U.S. PATENT DOCUMENTS

| | | |
|---|---|---|
| 2003/0195925 A1* | 10/2003 | Kaneko et al. ............. 709/203 |
| 2004/0052227 A1 | 3/2004 | Judd et al. |
| 2004/0064565 A1 | 4/2004 | Batra et al. |
| 2004/0120323 A1* | 6/2004 | Viikari et al. ............ 370/395.5 |

FOREIGN PATENT DOCUMENTS

| | | |
|---|---|---|
| EP | 1 220 514 A1 | 7/2002 |
| WO | WO 99/56431 | 11/1999 |
| WO | WO 01/01711 A1 | 1/2001 |
| WO | WO 01/22656 A2 | 3/2001 |
| WO | WO 01/33797 A2 | 5/2001 |
| WO | WO 01/37597 A1 | 5/2001 |
| WO | WO 01/63952 A1 | 8/2001 |
| WO | WO 01/74017 A1 | 10/2001 |
| WO | WO 02/01813 A2 | 1/2002 |
| WO | WO 02/09461 A1 | 1/2002 |
| WO | WO 02/15074 A2 | 2/2002 |
| WO | WO 02/15075 A1 | 2/2002 |

OTHER PUBLICATIONS

H. Nielsen, et al., "An HTTP Extension Framework," RFC 2774, The Internet Society, Feb. 2000 (downloaded from ftp://ftp.isi.edu/in-notes/rfc2774.txt).

* cited by examiner

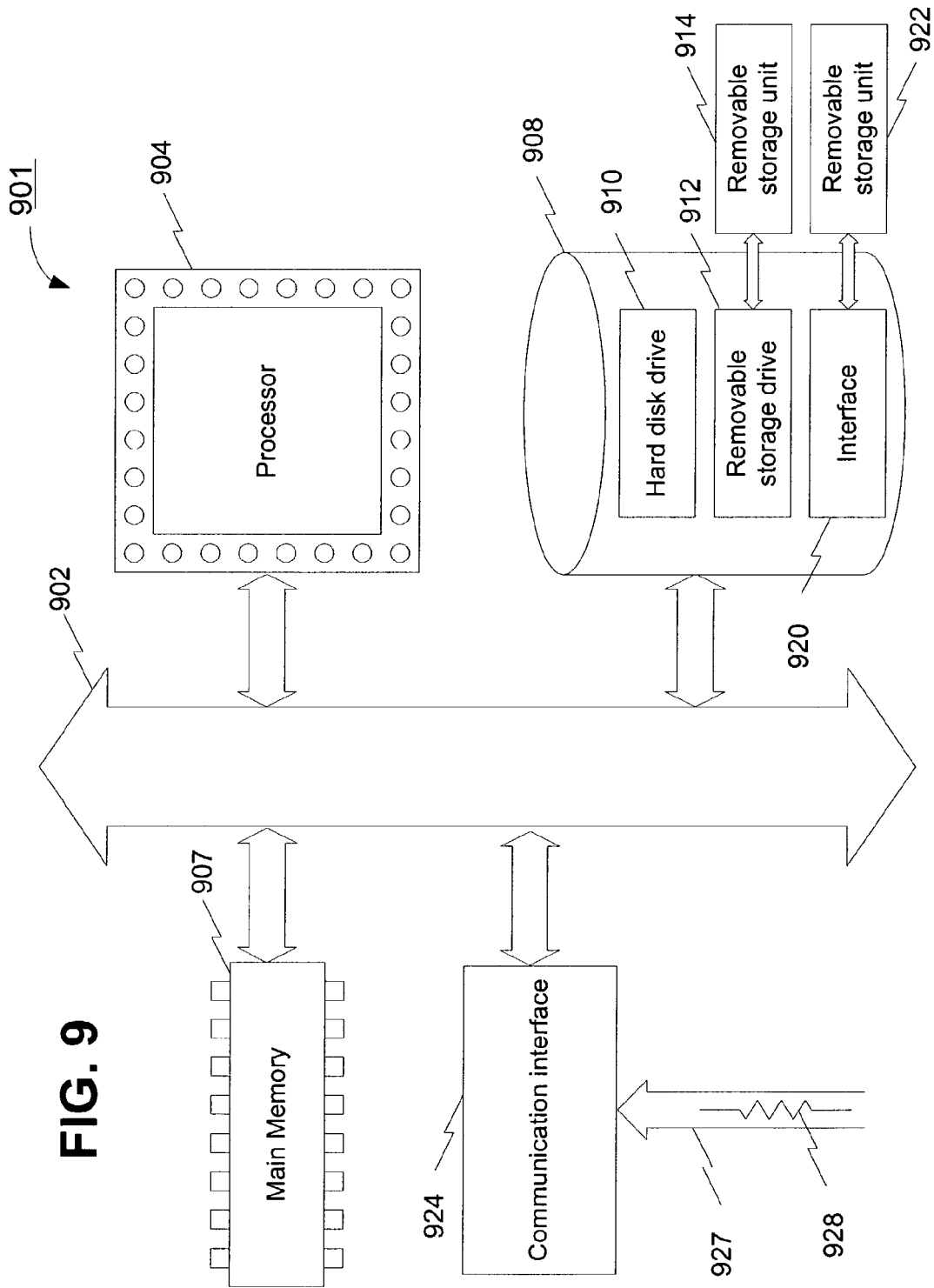

METHOD AND SYSTEM FOR PROVIDING LOCATION-BASED SERVICES

CROSS REFERENCE TO RELATED APPLICATIONS

This application is related to U.S. application Ser. No. 10/291,777, filed on even date herewith, entitled "Method and System for Providing Location-Based Services in a Multiple Coverage Area Environments," which is incorporated herein by reference in its entirety.

FIELD OF THE INVENTION

The present invention relates to communications. More particularly, the present invention relates to techniques for providing customized content to wireless communications devices across a communications network.

BACKGROUND OF THE INVENTION

Communications systems currently provide end-users with the capability to receive content items made available by content servers and providers. For example, end-users can receive multimedia broadcasts, audio broadcasts, images, data files, electronic documents, and database entries from various content servers. Such content items are delivered across a wireless network to portable end-user devices. Examples of portable end-user devices include wireless telephones, wireless personal digital assistants (PDAs), and portable computers having wireless communications capabilities.

Bluetooth is a system that enables wireless communications devices to request and receive resources from servers. Bluetooth defines a short-range radio network, originally intended as a cable replacement. It can be used to create ad hoc networks of up to eight devices, where one device is referred to as a master device. The other devices are referred to as slave devices. The slave devices can communicate with the master device and with each other via the master device. The Bluetooth Special Interest Group, *Specification Of The Bluetooth System*, Volumes 1 and 2, Core and Profiles: Version 1.1, Feb. 22, 2001, describes the principles of Bluetooth device operation and communication protocols. This document is incorporated herein by reference in its entirety. The devices operate in the 2.4 GHz radio band reserved for general use by Industrial, Scientific, and Medical (ISM) applications. Bluetooth devices are designed to find other Bluetooth devices within their communications range and to discover what services they offer.

Other short-range networks also exist. For example, wireless local area networks (WLANs), such as IEEE 802.11 and HIPERLAN also enable wireless communications devices to request and receive resources from servers.

In wireless environments, the location of a portable communications device may affect the type of information desired when its user makes a generic request for information. For instance, when requesting directions to a particular destination, a user would prefer the directions to be based on the user's current location.

To provide for such location-based content, a server or content provider that receives a request for content must learn the location of the requesting device. Accordingly, there is a need to provide device location information along with requests.

SUMMARY OF THE INVENTION

The present invention provides techniques for adding information, such as location indicators, to resource requests that are originated by wireless communications devices (WCDs). Accordingly, a method and system of the present invention obtains location-based information services. This method and system receives a WCD-originated resource request. The method and system adds a location indicator to the resource request that identifies a location of the WCD. This location indicator is based on a location of an access point that is in wireless communication with the WCD. Then, the method and system forward the resource request to a content server.

The location indicator may include location coordinates. Additionally, the location indicator may indicates a vertical position of the WCD. The resource request may be of different protocols. For example, the resource request may be a hypertext transfer protocol (HTTP) request or a wireless application protocol (WAP) request. In embodiments of the present invention, the location indicator may be selectively added to the resource request when the resource request identifies a suitable destination domain.

In addition to location indicators, the method and system may add other types of information to the request. For instance, the method and system may add user profile information and/or WCD class information to the resource request. Also, the method and system may add device identification information to the request, such as, a physical device address. An example of a device address is a Bluetooth Device Address (BD_ADDR). The content server could use this address to authenticate the originating WCD.

Various techniques may be employed to add such information to the request. For example, additional information may be inserted into a Uniform Resource Locator (URL). Alternatively, additional information may be inserted into one or more headers of the resource request. These headers may be extension headers.

The method and system may also selectively add information to the resource request, for example, the system and method may add information when the resource request identifies a suitable (or appropriate) destination domain, and/or when the originating WCD is one of a predetermined one or more WCDs.

The present invention is also directed to an apparatus for providing location-based services. The apparatus includes a location manager database and a location appending unit. The location manager database stores location indicators for short-range wireless communications devices (WCDs). The location indicator for each WCD is determined from a predetermined location of an access point that supports a wireless connection with the WCD. The location appending unit receives resource requests originated by the WCDs, and for each request, adds the location indicator that corresponds to the requesting WCD.

A further apparatus of the present invention includes a short-range wireless communications module for communicating with WCD devices, and a network interface that is coupled to a data network infrastructure for enabling communication with at least one content server. The apparatus further includes a memory, and a processor. The processor executes instructions stored in the memory for: (1) receiving a resource request originated by a wireless communications device (WCD) through the short-range wireless communications module; (2) adding to the resource request a location indicator that identifies a location of the WCD; and (3) forwarding the resource request, which includes the added location information to a content server through the network interface. The location indicator is based on a location of the apparatus.

A further method and system of the present invention receives a resource originated by a short-range WCD and forwards the request to a content server. The method and system also receives from the content server an instruction for a location indicator that identifies a location of the WCD, and determines this location indicator. The location indicator is determined based on a location of an access point that is in communication with the WCD. The method and system sends this location indicator to the content server.

The present invention is also directed to computer program products including a computer useable medium having recorder computer program logic. These computer program products enable a processor to provide the methods, systems, and apparatuses of the present invention.

The present invention advantageously provides for device location information to accompany requests for resources. Further features and advantages will be apparent from the following description.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein:

FIG. 9 is a block diagram of an exemplary computer system.

DETAILED DESCRIPTION OF THE PREFERRED EMBODIMENTS

I. Operational Environment

Figure 1:
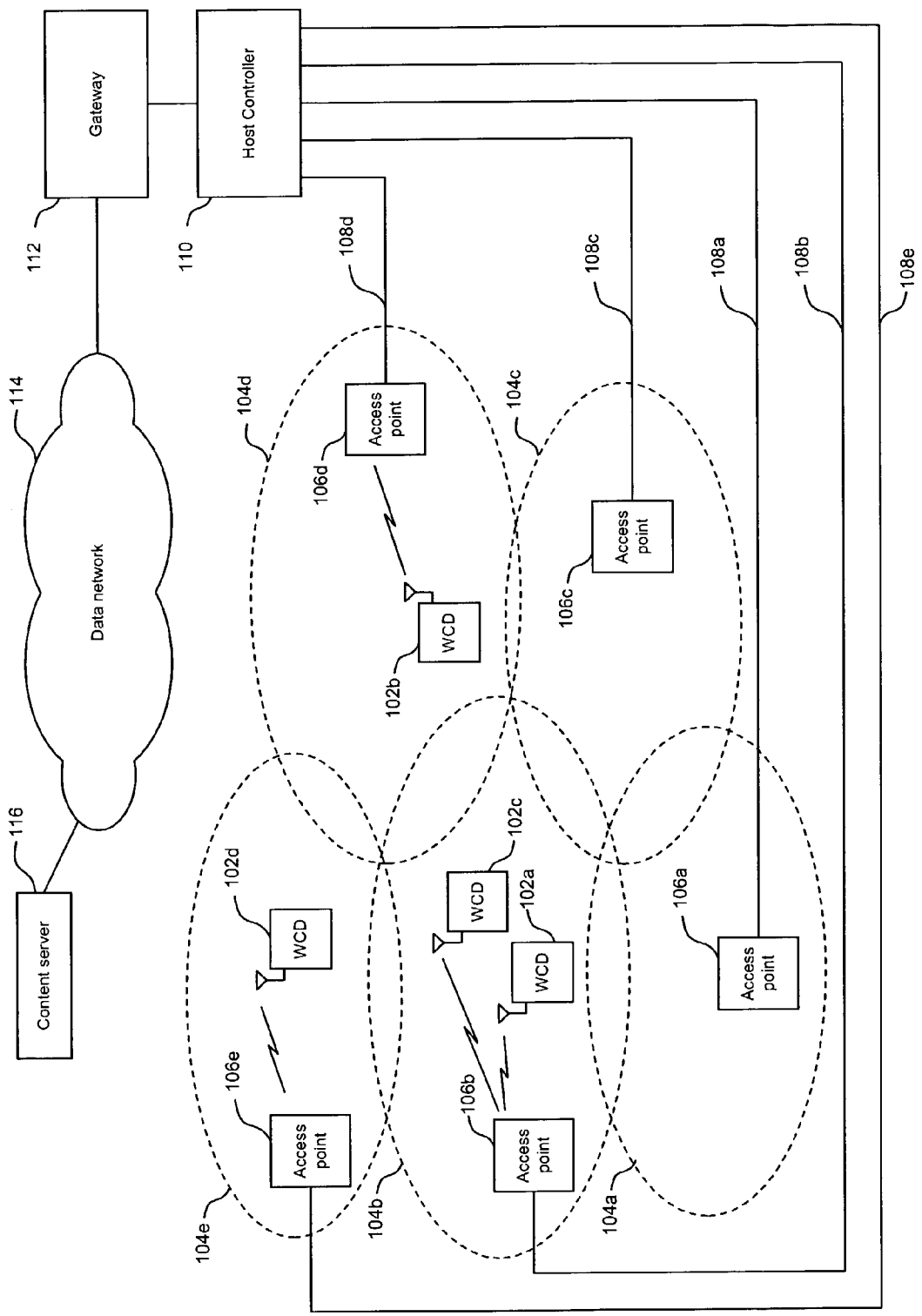
FIG. 1 is a block diagram of a short-range wireless communications environment according to an embodiment of the present invention.

Before describing the invention in detail, it is helpful to describe an environment in which the invention may be used. FIG. 1 is a block diagram of a short-range wireless communications environment in which the present invention may be employed. This exemplary environment includes multiple wireless communications devices (WCDs) 102, a plurality of access points 106, a host controller 110, a gateway 112, a data network 114, and a content server 116.

WCDs 102 engage in end-to-end client-server communications with content server 116. Such communications involve WCDs 102 sending requests for resources to content server 116. In response to these requests, content server 116 transmits content, such as hypertext documents, to the requesting WCDs 102.

Each WCD 102 may be a wireless mobile phone, a wireless PDA, a pager, a two-way radio, a smartphone, a personal communicator, or any other wireless device apparent to persons skilled in the relevant arts. WCDs 102 transmit requests according to protocols, such as the wireless application protocol (WAP) and the hypertext transfer protocol (HTTP).

When engaging in WAP communications with content server 116, a WCD 102 functions as a WAP client. To provide this functionality, WCD 102 includes a processor that executes WAP client software. WAP software contains components, such as a Wireless Markup Language (WML) Browser, a WMLScript engine, a Push Subsystem, and a Wireless Protocol Stack that are known to persons skilled in the relevant art(s).

WAP-enabled WCD 102 may access small files called decks, which are each composed of smaller pages called cards. Cards are small enough to fit into a small display area that is referred to as a microbrowser. The small size of the microbrowser and the small file sizes are suitable for accommodating low-memory devices and low-bandwidth communications constraints imposed by the wireless communications systems, such as Bluetooth.

Cards are written in the Wireless Markup Language (WML), which is specifically devised for small screens and one-hand navigation without a keyboard. WML is scaleable so that it is compatible with a wide range of displays that covers two-line text displays, as well as large LCD screens found on devices, such as smart phones, PDAs, and personal communicators. WML cards may include programs written in WMLScript, which is similar to JavaScript. However, through the elimination of several unnecessary functions found in these other scripting languages, WMLScript makes minimal processing and memory demands WCDs 102.

Requests travel from a WCD 102 to content server 116 through an access point 106, host controller 110, gateway 112, and data network 114. Responses to these requests travel from content server 116 through gateway 112, and access points 106. From each received request, content server 116 may select content that is appropriate for the requesting WCD 102. This selection may be based on the location and/or other characteristics of the requesting WCD 102.

In the environment of FIG. 1, WCDs 102 communicate with access points 106 according to a short-range wireless communications standard, such as Bluetooth. These communications may employ a profile, such as the Bluetooth Personal Area Network (PAN) profile.

Each access point 106 has a predetermined location and a coverage area 104. Each access point 106 may communicate with devices (such as WCDs 102) that are within its respective coverage area 104. Coverage areas 104 may vary in shape and size. However, for short-range communications systems, coverage areas are generally small. For instance, coverage areas for Bluetooth access points are typically between 10 and 30 meters in radius.

FIG. 1 shows that each access point 106 is connected to host controller 110 by links 108a-e. These links may be either wireless or wired links. For example, links 108 may be short-range (e.g., Bluetooth) links. Although FIG. 1 shows host controller 110 as a distinct entity, it may alternatively be located within one of access points 106.

When host controller 110 is implemented as a distinct entity, it may be placed in a variety of locations. For instance, host controller 110 may be located within one or more of coverage areas 104. For such locations, host controller 110 may exchange information with access points 106 through short-range wireless links.

Host controller 110 receives requests from access points 106 that are originated by WCDs 102. Host controller 110 may then add information to these requests. Host controller 110 forwards these requests to gateway 112

As shown in FIG. 1, host controller 110 is connected to a gateway 112. Gateway 112 provides connectivity to data network 114. To provide this connectivity, gateway 110 may perform functions, such as protocol conversion and buffering.

Data network 114 provides accessibility to information resources, such as content server 116. In embodiments of the present invention, data network 114 is a packet network, such as the Internet, where data packets are exchanged according to various protocols, such as TCP/IP, HTTP, and WAP.

While not shown in FIG. 1, one or more of the access points 106 may be directly connected to gateway 112 by either wired or wireless links to allow direct access to data network 114. Also, one or more of the access points 106 may be directly connected to data network 114 to provide even more direct access to information resources, such as content server 116. Such communications allow content to be delivered to WCDs 102 without passing through host controller 110, and possibly even gateway 112.

WCDs 102 are portable devices. Therefore, during operation, they may move between coverage areas 104 and communicate with different access points 106. Thus, at any moment in time, the location of a particular WCD 102 is indicated by the location of the access point 106 that it is communicating with. This location indication is quite accurate because in short-range wireless environments, each coverage area 104 is relatively small.

In fact, this location indication may identify vertical positions of WCDs 102 in certain environments. For instance, in structures such as multi-level buildings, RF signals transmitted by Bluetooth access points are typically not strong enough to penetrate through flooring material, such as concrete. Therefore, with systems such as Bluetooth, vertical positions of WCDs 102 may be determined from the identity of the corresponding access point 106.

To provide content server 116 with WCD 102 locations, host controller 110 processes requests received from WCDs 102. In particular, upon receiving a request, host controller 110 determines the location of the WCD 102 that originated the request. Then, host controller 110 adds this location to the request, and forwards the request along its route to content server 116. In the environment of FIG. 1, the next destination along this route is gateway 112.

Content server 116 receives the request and, from information added to the request, such as an accurate location indicator, may advantageously provide a variety of location-based service features that have not been previously available.

II. Database Architecture

Figure 2:
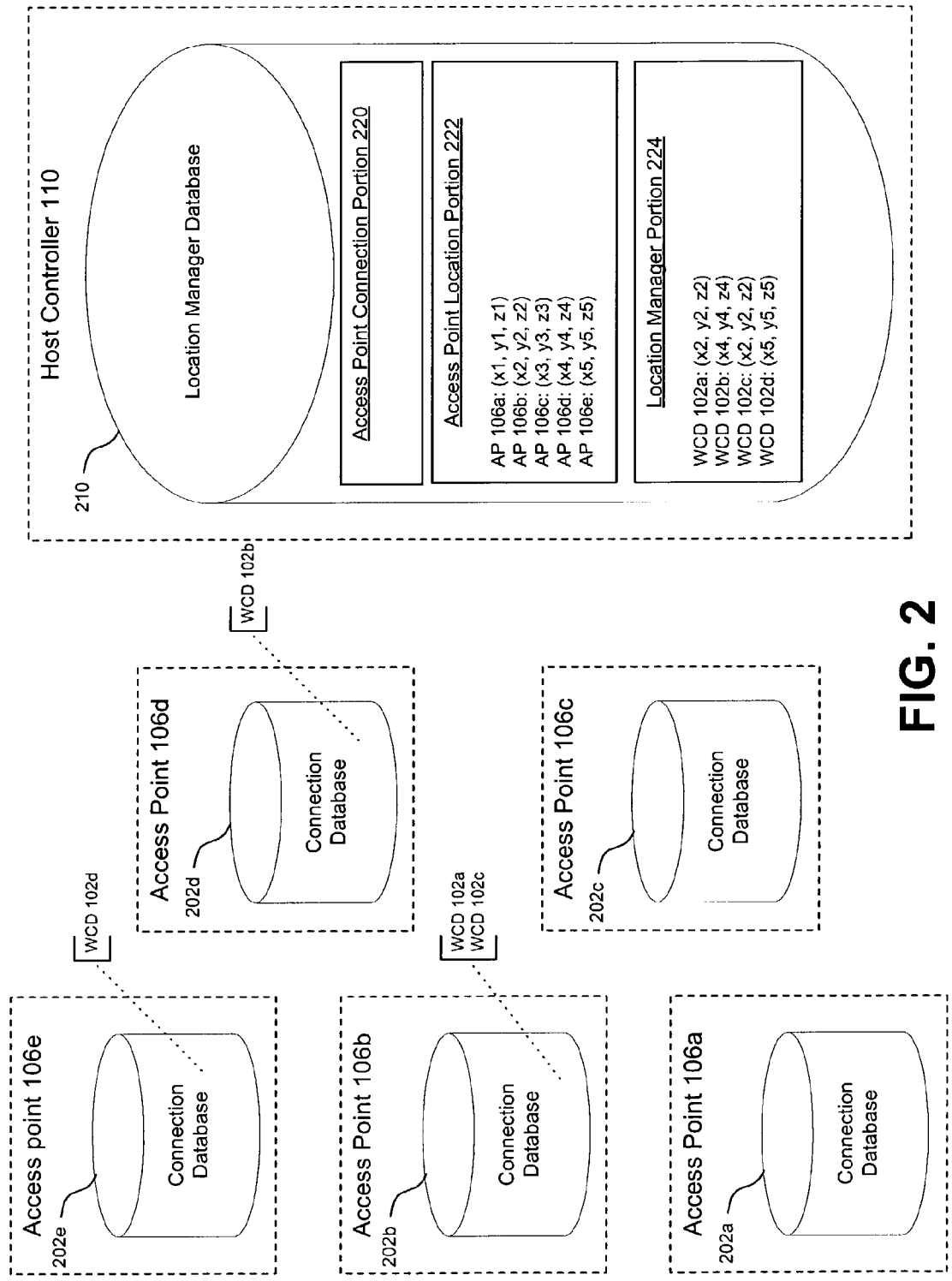
FIG. 2 is a block diagram of a database architecture according to an embodiment of the present invention.

Host controller 110 determines WCD 102 locations from the location of corresponding access points 106. In order for host controller 110 to keep track of WCD 102 locations, embodiments of the present invention employ a database architecture that is shown in FIG. 2. In this architecture, databases are included within host controller 110 and access points 106a-e.

As shown in FIG. 2, each access point 106 includes a connection database 202. Connection databases 202 each provide a listing of the WCD 102 connections supported by the corresponding access point 106. For instance, connection database 202b in FIG. 2 shows that access point 106b supports connections with WCDs 102a and 102c. Connection database 202d shows that access point 106d supports a connection with WCD 102b. Connection database 202e shows that access point 106e supports a connection with WCD 102d.

FIG. 2 shows that host controller 110 includes a location manager database 210. Location manager database 210 includes an access point connection portion 220, an access point location portion 222, and a location manager portion 224.

Access point connection portion 220 stores connection information for each access point 106. Thus, access point connection portion 220 stores copies of information contained in each of connection databases 202. To keep these copies updated, access points 106 transfer the contents of their respective databases 202 to host controller 110 either continually, or at predetermined time intervals.

Access point location portion 222 stores location information for each of access points 106. This location information (also referred to as "location handles") may be in the form of coordinates. Such coordinates may be rectangular (i.e., x, y, z). Alternatively, such coordinates may be latitude, longitude, and altitude. In further alternatives, other suitable coordinate systems may be employed.

Location manager portion 224 stores location indicators for the WCDs 102 that are communicating with access points 106. Accordingly, location manager portion 224 includes records that each include a WCD 102 identifier, such as a BD_ADDR, and a corresponding location indicator. Since each access point 106 has a predetermined location, its connected WCDs 102 have approximately the same location (e.g., within 10-30 meters in Bluetooth implementations). Using the location handles in access point location portion 222, a location indicator is assigned to each WCD 102 that is communicating with an access point 106. As shown in FIG. 2, location manager portion 224 stores a location indicator for each of WCDs 102a-d.

III. Host Controller

Figure 3:
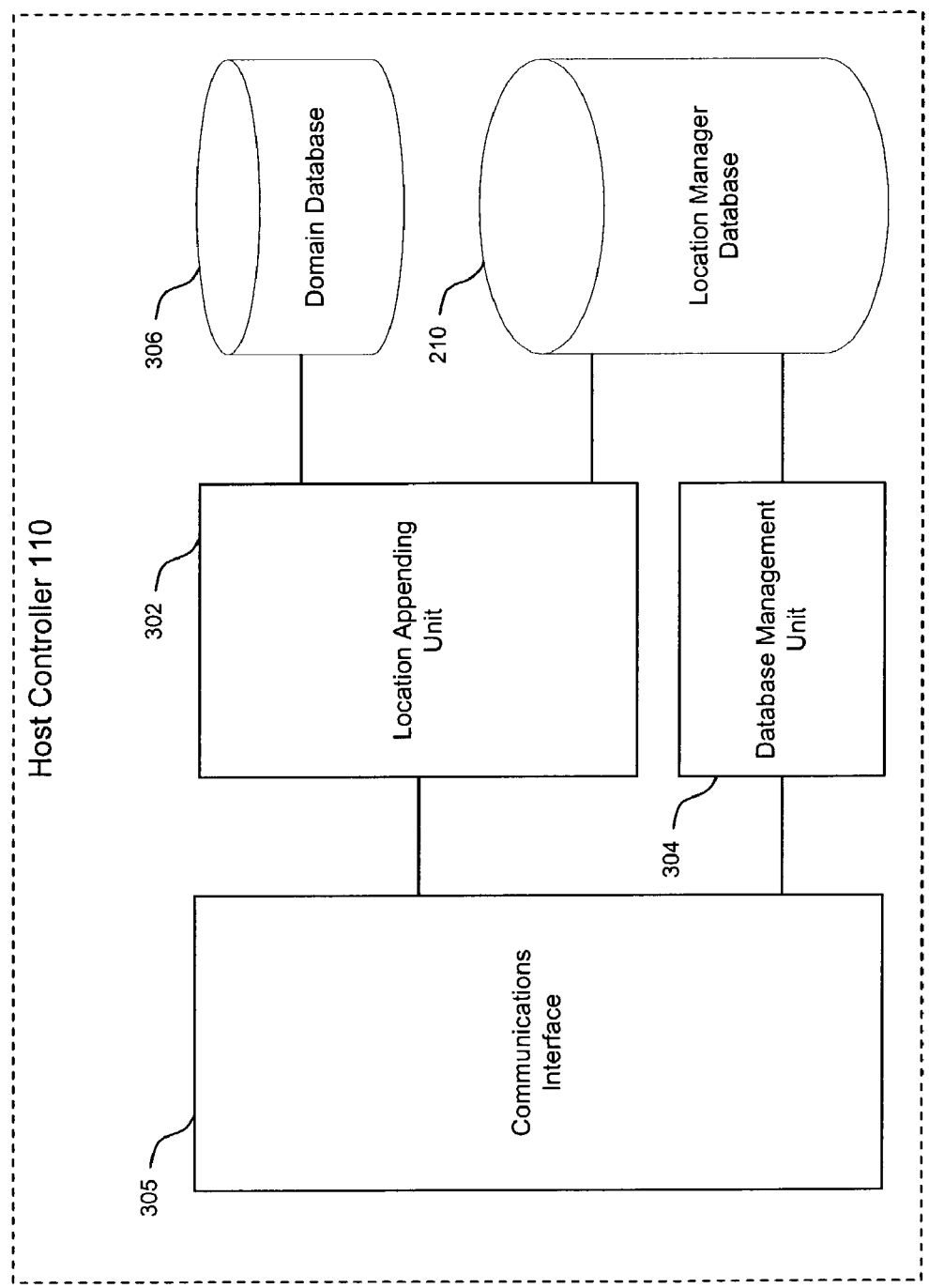
FIG. 3 is a block diagram of a host controller implementation according to an embodiment of the present invention.

The database implementation of FIG. 2 is utilized by processing elements within host controller 110. FIG. 3 is a block diagram of a host controller 110 implementation that shows these processing elements. As shown in FIG. 3, host controller 110 includes a location appending unit 302, a database management unit 304, and a communications interface 305. FIG. 3 also shows that in addition to location manager database 210, host controller 110 includes a domain database 306. These elements may be implemented with hardware, software, firmware, or any combination thereof.

Location appending unit 302 appends location indicators to WCD-originated requests that are received from access points 106. For a particular request, this appending includes identifying the originating WCD 102, and retrieving from location manager portion 224 the location indicator that corresponds to this WCD 102. After this retrieval, WCD 102 appends the location indicator to the request, and forwards the request to gateway 112. This feature allows content server 116 to provide accurate location-based services.

Location appending unit 302 may also add other WCD 102 and/or user related information to received requests. Such features may be employed in circumstances, such as when a user has authorized the operator of host controller 110 to add such information to requests. This feature enables user profile based and/or device class based service creation in addition to location-based services.

Database management unit 304 performs functions related to the maintenance of databases within host controller 110. In particular, database management unit 304 receives connection database 202 records from access points 106 and upon receipt of these records, updates the contents of portion 220 in location manager database 210. In addition, database management unit 304 maintains location manager portion 224. This involves establishing and updating records in location manager portion 224. As described above, these records each include a WCD 102 identifier, such as a BD_ADDR, and a corresponding location indicator.

As shown in FIG. 3, communications interface 305 is coupled to location appending unit 302 and database management unit 304. Communications interface 305 exchanges information with other entities that are external to host controller 110. For example, communications interface 305 receives from access points 106 content requests and information stored in connection databases 202. In addition, communications interface 305 transmits requests to their next destination(s) along their route to content server 116. In the environment of FIG. 1, the next destination is gateway 112.

Such communications may be according to various protocols. For example, communications interface 305 may employ short-range wireless (e.g., Bluetooth) communications techniques to communicate with access points 106 and/or gateway 112. Alternatively, communications interface 305 may employ wired communications techniques or a combination of wireless and wired techniques in performing such communications.

Communications interface 305 also exchanges information with elements within host controller 110. For instance, communications interface 305 receives WCD-originated content requests from access points 106 and forwards these requests to location appending unit 302 for processing. Once processed, communications interface 305 receives these requests from location appending unit 302, and forwards these requests along their route to content server 116. These steps may involve extracting content requests from transmission units, such as communications packets received by access points 106, and reformatting requests received from location appending unit 302 for transmission.

IV. Filtering

Host controller 110 may selectively append location indicators to requests. Thus, location appending unit 302 may perform "filtering" operations in order to provide appended information only to certain requests.

For instance, location appending unit 302 may append location information to content requests that relate to the location of the requesting WCDs 102. An example of such location-based filtering may be applied in a shopping mall context, where access points 106 are distributed at different locations in the mall. When host controller 110 receives requests from these access points that are directed to shopping-related content, location appending unit 302 appends location information to the requests. However, when host controller 110 receives requests from these access points that are unrelated to shopping content, it does not append any location information to the requests.

Location appending unit 302 may base such determinations on resource address information contained in domain database 306. Thus, upon receiving a request, location appending unit 302 determines the access point 106 that forwarded the request. Then, location appending unit 302 accesses records in domain database 306 that correspond to this access point. These records may include resource identifiers, such as domain names, that are appropriate for the appending of location information.

The employment of domain database 306 advantageously allows the appending of location information to be a subscription or fee service paid by content providers. Namely, the party controlling host controller 110 may provide additional information, such as location indicators, only to content servers that subscribe and/or pay for such information.

Host controller 110 may also perform "filtering" operations based on the identity of the requesting WCD 102. For instance, location appending unit 302 may selectively append location information only to requests generated by certain WCDs 102. A list of these WCDs 102 may be maintained in domain database 306. This feature advantageously enables WCD 102 users to be treated with different levels of service. For example, some WCD 102 users may receive premium location-based services, while other may not. Users may be differentiated according to various schemes. In one such scheme, users that make frequent requests receive location-based services.

Filtering operations based on the identity of the requesting WCD 102 may be performed alone or in combination with other filtering operations, such as the filtering techniques described above.

V. Operation

Figure 4A:
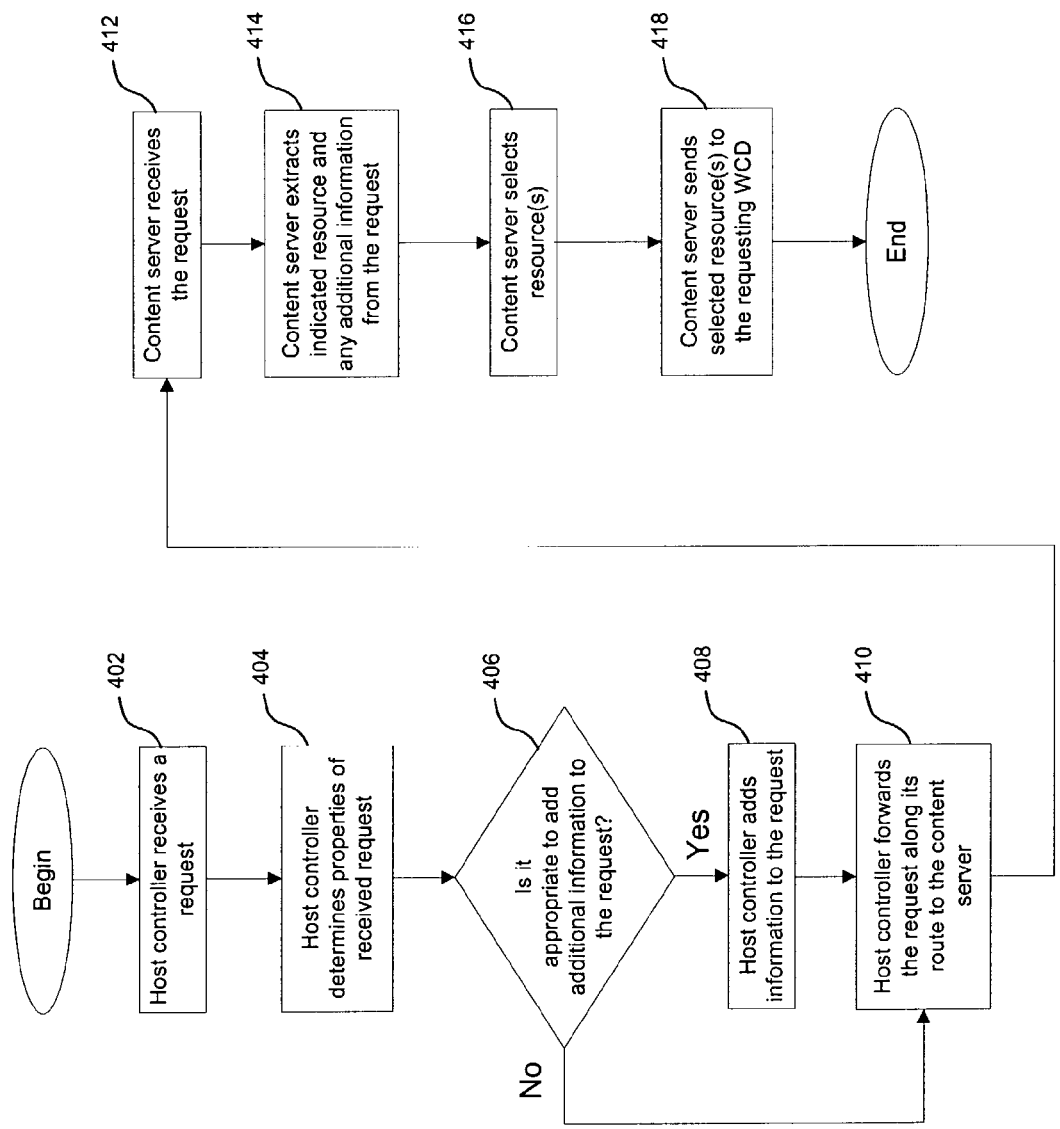
FIGS. 4A and 4B are flowcharts illustrating operational sequences involving a resource requests originated by wireless communications devices according to embodiments of the present invention.
Figure 4B:
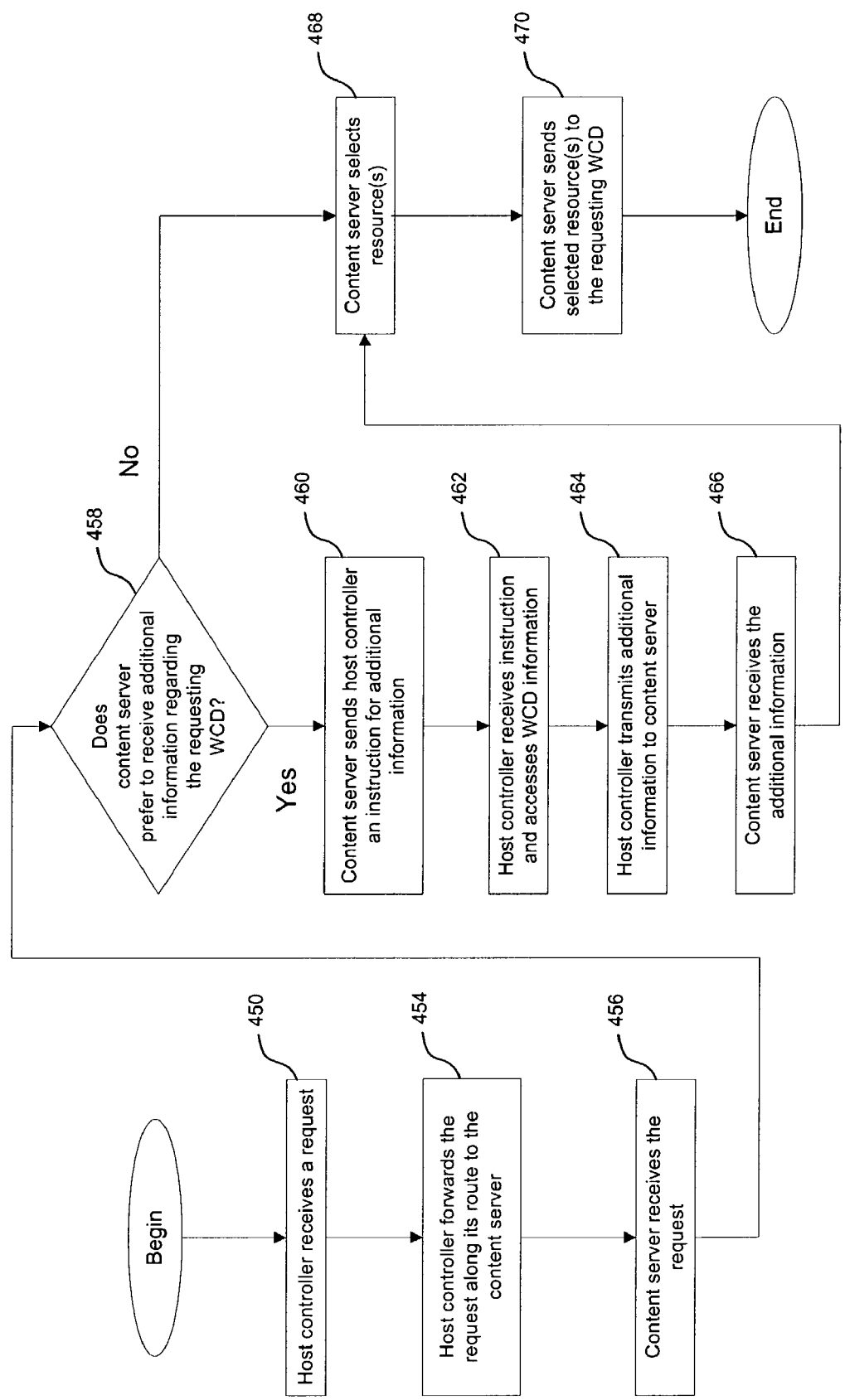

FIGS. 4A and 4B are flowcharts illustrating operational sequences according to the present invention. These sequences are described with reference to the operational environment of FIG. 1. However, they may be employed with other environments and network topologies. Also, while the flowcharts show steps being performed in a certain order, other orders are within the scope of the present invention.

The operational sequence shown in FIG. 4A begins with a step 402. In this step, host controller 110 receives a request for content such as a WML document, an HTML document, or other forms of content. Accordingly, the received request includes a resource identifier, such as a uniform resource locator (URL).

Next, in a step 404, host controller 110 determines properties of the received request. Examples of such properties include the identity (i.e., the device address) of the requesting WCD 102, and the identity of the forwarding access point 106.

In embodiments of the present invention, the request may not physically identify the requesting WCD 102. Rather, the request may merely contain an originating address, such as an IP address. A physical device address, such as a media access control (MAC) address, may be needed to determine the corresponding access point 106. In Bluetooth implementations, such an address is a Bluetooth device address (BD_ADR). Accordingly, step 404 may comprise accessing a server, such as a dynamic host configuration protocol (DHCP) server to determine the device address of the requesting WCD 102. Alternatively, step 404 may comprise sending (e.g., broadcasting) a message, such as an address resolution protocol (ARP) message to access points 106 and/or WCDs 102 to receive this physical address. Such techniques are described below with reference to FIG. 6.

Once the device address is determined, host controller 110 may determine the corresponding access point 106. As described above with reference to FIG. 2, the corresponding access point 106 may be determined from, for example, location manager database 210.

In a step 406, host controller 110 determines whether it is appropriate to add additional information to the request. If so, then a step 408 is performed. Otherwise, operation proceeds to a step 410. With reference to FIG. 3, step 406 may comprise accessing domain database 306 according to the resource identified in the request and the forwarding access point 106 to determine whether adding information to the request is appropriate. Also, step 406 may comprise accessing domain database 306 to determine whether adding information to requests from the requesting WCD 102 is permitted.

In step 408, host controller 110 adds additional information to the request. This step may additionally or alternatively comprise location appending unit 302 appending a location indicator to the request. This step may comprise host controller 110 (e.g., location appending unit 302) adding other information to the request that conveys characteristics of the requesting WCD 102. Examples of such additional information include user profile information, the device class of the requesting WCD 102 (e.g., wireless phone, PDA, etc.), and the physical address of the requesting WCD 102.

In step 410, host controller 110 forwards the request along its route to content server 116. In the topology of FIG. 1, the next point along this route is gateway 112.

Next, in a step 412, content server 116 receives the request. After step 412, a step 414 is performed. In step 414, content server 116 extracts the indicated resource from the request and any additional information contained in the request, such as an added location indicator.

A step 416 follows step 414. In this step, content server 116 selects content that is based on the resource identifier and additional information (such as a location indicator) contained in the request. Next, in a step 418, content server 116 transmits the selected content to the requesting WCD 102.

The operational sequence shown in FIG. 4B is similar to the sequence shown in FIG. 4A. However, unlike the sequence in FIG. 4A, host controller 110 does not add information to received requests until it receives an instruction from content server 116.

This sequence begins with a step 450. In this step, host controller 110 receives a request for content such as a WML document, an HTML document, or other forms of content. Accordingly, the received request includes a resource identifier, such as a uniform resource locator (URL).

In step 454, host controller 110 forwards the request along its route to content server 116. In the topology of FIG. 1, the next point along this route is gateway 112. Next, in a step 456, content server 116 receives the request.

In a step 458, content server 116 determines whether it would prefer to receive additional information, such as a location indicator. If so, then operation proceeds to a step 460. Otherwise operation proceeds to a step 468.

In a step 460, content server 116 sends an instruction to host controller 110, which may arrive at host controller 110 via gateway 112. This instruction directs host controller 110 to provide additional information regarding the WCD 102 that originated the request. Such additional information may include user profile information, the device class of the requesting WCD 102, and/or the physical address of the requesting WCD 102. This instruction contains information to identify the requesting WCD 102. For example, in IP networking contexts, such identifying information may include the IP address used by the requesting WCD 102.

In a step 462, host controller 110 receives the instruction from content server 116. Based on this instruction, host controller 110 accesses information corresponding to the WCD 102 that originated the request. For example, based on an address contained in the instruction from content server 116, host controller 110 may obtain a location indicator from location manager database 210.

In response to the request received from content server 116, a step 464 follows step 462. In this step, host controller 110 transmits to content server 116 the additional information accessed in step 462. In the environment of FIG. 1, this additional information may travel through gateway 112 and across data network 114 to arrive at content server 116. Content server 116 receives this additional information in a step 466.

As shown in FIG. 4B, step 468 follows either step 458 or step 466. In this step, content server 116 selects content (i.e., resources). When step 468 follows step 458, this selection is based on the resource identifier in the WCD-originated request. However, when step 468 follows step 466, this selection is based on both the resource identifier in the WCD-originated request and additional information (such as a location indicator) forwarded by host controller 110 in step 464.

A step 470 follows step 468. In this step, content server 116 transmits the selected content to the requesting WCD 102.

In FIGS. 4A and 4B, host controller 110 provides additional information to content server 116. For instance, FIG. 4A illustrates host controller 110 adding information to requests that it receives from WCDs 102. Likewise, FIG. 4B illustrates host controller 110, when instructed, providing WCD-related information to content server 116. However, such operations may be performed by other entities. For example, steps 402-410, 450, 454, 462, and 464 may be performed by a gateway, such as gateway 112, or a gateway as shown in FIG. 5.

Figure 5:
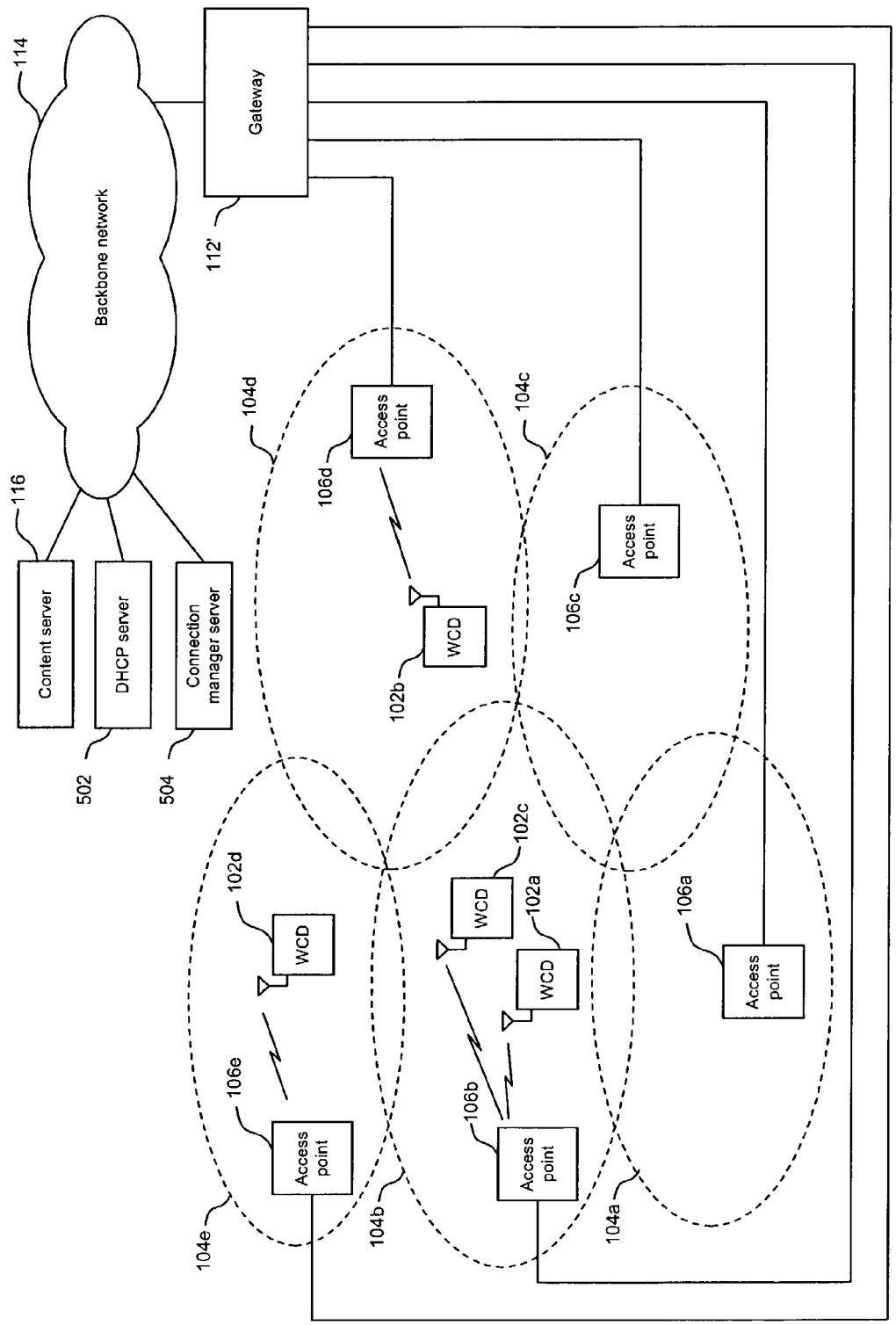
FIG. 5 is a block diagram of a Bluetooth environment according to an embodiment of the present invention.

FIG. 5 is a block diagram of a Bluetooth environment where a gateway 112' adds information to requests. The environment of FIG. 5 is similar to the environment of FIG. 1. However, to add this information, gateway 112' relies on information provided by servers that are accessible through data network 114. As shown in FIG. 5, these servers include a dynamic host configuration protocol (DHCP) server 502, and a connection manager server 504.

In FIG. 5, each WCD 102 may establish a Bluetooth connection with an access point 106 according to a personal area networking (PAN) profile. Once establishing a Bluetooth connection with an access point 106, a WCD 102 obtains an IP address from DHCP server 502. DHCP server 502 stores the short-range wireless media access control (MAC) address of each WCD 102 that is communicating with an access point 106. In Bluetooth implementations, this MAC address is in the form of a Bluetooth device address (BD_ADDR). For each of these MAC addresses, DHCP server 502 stores the corresponding IP address. These addresses may be stored in a file, such as a leases file. This storage makes it possible to cross-reference IP addresses and short-range wireless MAC addresses.

As in FIG. 1, each access point 106 in FIG. 5 has a predetermined location. In some implementations, each access point 106 "knows" its predetermined location. During an initialization procedure, each access point 106 forwards this location to a centralized database (e.g., location manager database 210). In the environment of FIG. 5, location management database 210 is stored in connection manager server 504. Thus, connection manager server 504 also stores correspondences between WCDs 102 and the access points 106 that support their wireless communications. Access points 106 may transmit these correspondences to connection manager server 504 at, for example, predetermined time intervals or whenever these correspondences change.

Figure 6:
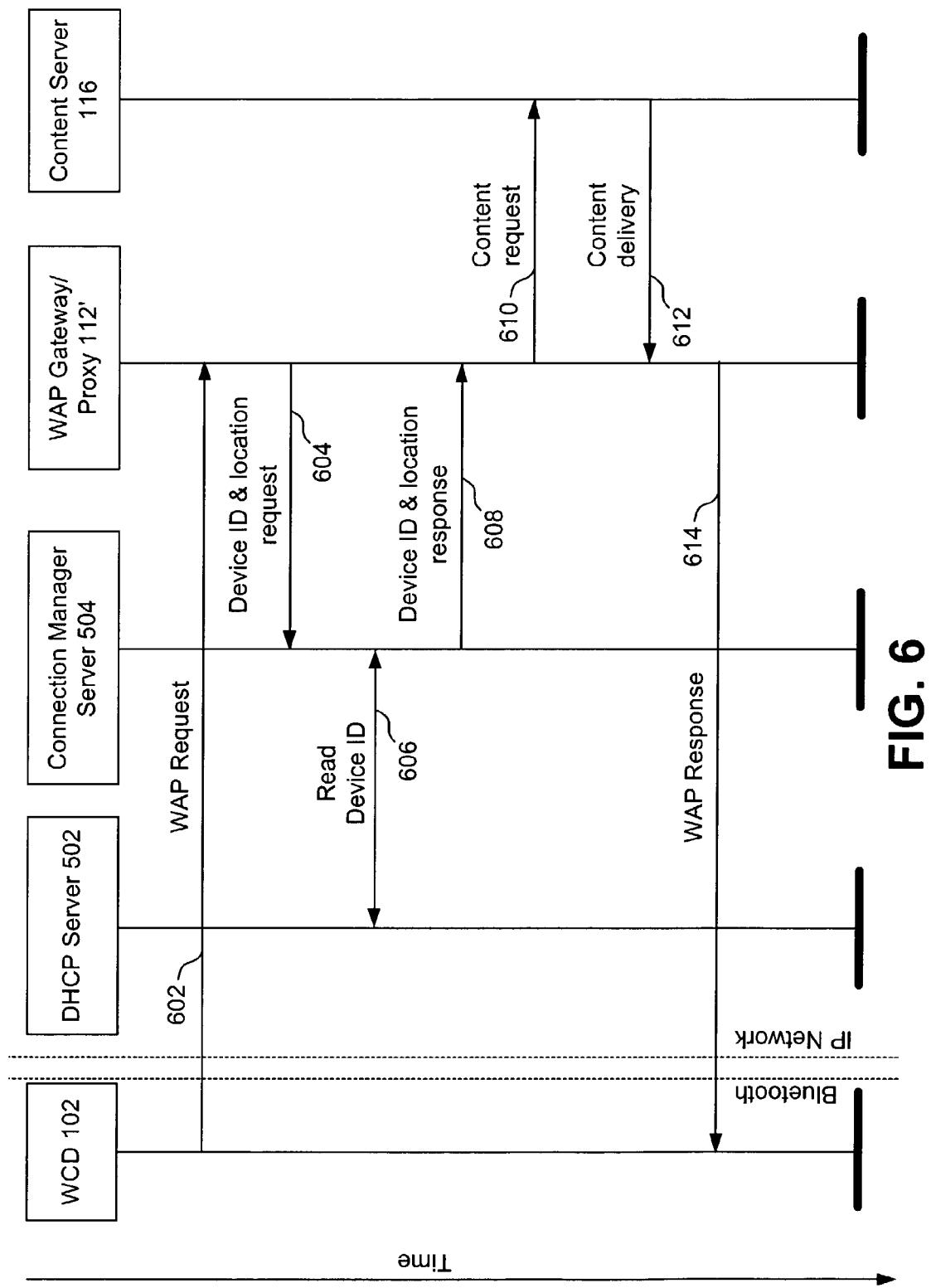
FIG. 6 is a flowchart illustrating an operational sequence involving a resource request originated by a wireless communications device according to an embodiment of the present invention.

FIG. 6 shows a sequence of operation for the environment shown in FIG. 5. This sequence begins with a step 602. In this step, a WCD 102 transmits a WAP request that is forwarded by an access point 106 to gateway 112'.

In a step 604, gateway 112' sends a device ID and location request to connection manager server 504. This request includes the IP address used by the requesting WCD 102.

Connection manager server 504 receives this request, and in a step 606, reads the WCD 102 device ID (i.e., its BD_ADDR) from DHCP server 502. Step 606 may comprise transmitting a request to DHCP server 502 that contains the IP address used by the requesting WCD 102, and receiving a response from DHCP server 502 that contains its BD_ADDR.

From the device ID received in step 606, connection manager server 504 determines the location of the requesting WCD 102. This determination is based on the location of the access point 106 that forwarded the request to gateway 112'. As described above, connection manager server 504 stores correspondences between WCDs 102 and access points 106.

Next, in a step 608, connection manager server 504 sends the location of the requesting WCD 102 to gateway 112'. In addition, connection manager server 504 may also send the device ID of the requesting WCD 102 during this step. Upon receipt of this information, gateway 112' may add information to the WAP request. Thus, at this point, gateway 112' performs steps 404-408 of FIG. 4A.

In a step 610, gateway 112' sends a content request to content server 116. Upon receiving this request, content server 116 selects content based on the resource identified in the request, as well as on any additional information (such as a location indicator) contained in the request. Next, in a step 612, content server 116 delivers content to the requesting WCD 102 via 112'.

As described above with reference to FIG. 6, the MAC addresses (i.e., BD_ADDR) of WCDs 102 are obtained from DHCP server 502. However, these MAC addresses may alternatively be determined through mechanisms, such as the address resolution protocol (ARP). ARP is protocol used to convert an IP address into a device address, such as a Bluetooth address. According to this protocol, a physical address is determined by broadcasting an ARP request containing an IP address onto a network. A device connected to the network that has the IP address then replies with its device address.

Also, as described above with reference to FIG. 6, WCD 102 locations are obtained from connection manager server 504. However, as an alternative to this technique, once gateway 112 receives the MAC address of a requesting WCD 102, it may determine the location of the requesting WCD 102 through MAC addresses provided directly by access points 106.

VI. Extension Headers

The present invention provides for the addition of information to requests. Various techniques may be employed to add such information. For instance, additional information may be added to HTTP and WAP requests as HTML extension headers.

As described above, users of wireless devices, such as WCDs 102, may originate and send requests for content offered by content providers, such as content server 1116. In short-range communications environments, such as the ones shown in FIGS. 1 and 5, such requests pass through intermediate points. For example, in FIG. 1, such requests may pass through an access point 106, host controller 110, and gateway 112 before reaching a content provider. In FIG. 2, requests may pass through an access point 106 and gateway 112' before reaching a content provider.

According to the present invention, these intermediate points may add information to requests, such as WCD location indicators and/or other information. The employment of extension headers is one technique for adding such information. This technique may be employed in various protocols, such as HTTP and WAP. However, for purposes of convenience, the following is a description in the context of HTTP.

Header lines provide information about an HTTP transmission, such as a GET request. Headers may convey various information about originator of the HTTP message. For instance, HTTP version 1.0 and 1.1 define a "From" header that specifies an e-mail address of request's originator.

HTTP extensions allow parameters in the form of headers to be added to GET requests that may be visible by the recipient (e.g., content server 116) at the HTTP protocol layer. Thus, HTTP extension headers provide for the introduction of new encodings into HTTP messages and the extension of information that may conveyed in a single HTTP message.

A framework for extension headers is described RFC 2774, published by the Internet Society in 2000. This document may be downloaded at ftp://ftp.isi.edu/innotes/rfc2774.txt, and is incorporated herein by reference in its entirety. According to the framework of RFC 2774, a party may specify an extension and assign a globally unique Uniform Resource Indicator (URI) to the extension.

When a client or server (referred to herein as an agent) employs the extension, it declares its use by referencing the extension's URI in an extension declaration in an HTTP message. This message may contain headers defined by the extension. Based on the extension declaration in the HTTP message, the recipient of the message deduces how to interpret the extended message.

Thus, upon receiving WCD-originated requests, an entity that adds information (e.g., location indicators) to requests may employ an extension to regenerate or reformat the requests so that they contain additional information. An example of such an extension includes a header that includes a location code. This location code indicates the location of the requesting WCD. As described above, this location indicator may be based on coordinates of the access point that communicates with the requesting WCD. Thus, the location code may include access point 106 coordinates.

Although extension headers may be employed to add information to requests, other techniques may be applied. For example, common gateway interface (CGI) scripts may be employed. Also, information, such as a location indicator, may be added to a resource indicator, (e.g., a Uniform Resource Locator) contained in the request.

VII. Access Point Implementation

In the above examples, host controller 110 and gateway 112' add information to requests. However, in further embodiments of the present invention, access points, such as access points 106 may instead add information to requests.

Figure 7:
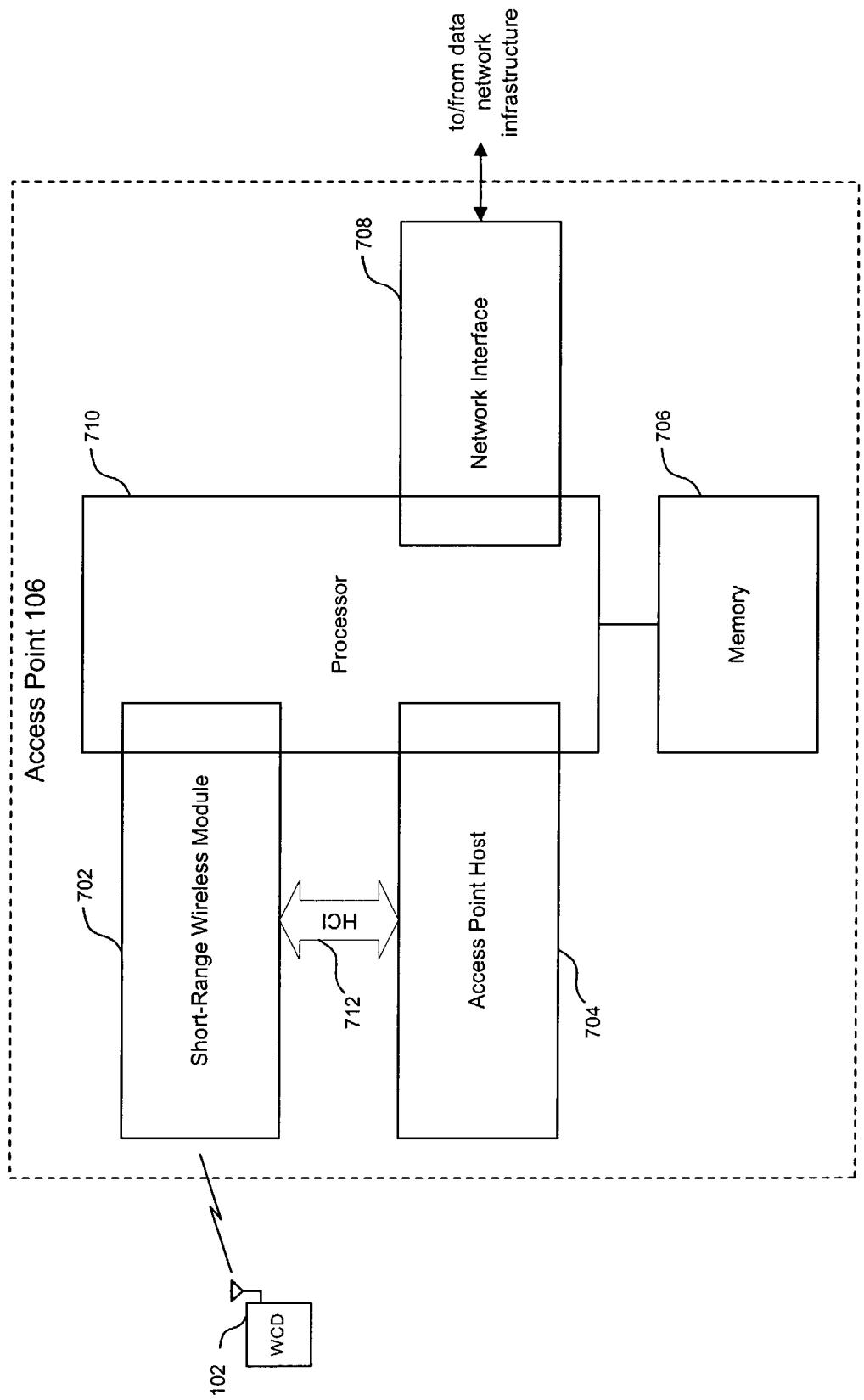
FIG. 7 is a block diagram of an access point implementation that adds information to requests received from wireless communications devices, according to an embodiment of the present invention.

FIG. 7 is a block diagram illustrating an access point implementation that adds information generated by requests received from WCDs 102. As shown in FIG. 7, this implementation includes a short-range wireless module 702, an access point host 704, a memory 706, a network interface 708, and a processor 710.

Access point host 704 is responsible for performing higher protocol layer (e.g., application layer) operations, while short-range wireless module 702 is responsible for lower layer protocol operations. For example, in Bluetooth implementations, short-range wireless module 702 is a Bluetooth module that performs Bluetooth link manager layer and Bluetooth link controller layer functions, as well as the transmission and reception of RF signals through one or more antennas (not shown).

Access point host 704 and short-range wireless module 702 communicate with each other according to a host controller interface (HCI) 712. Bluetooth specifies formats for messages and/or packets that cross HCI 712. Examples of such standard messages include short-range wireless module 702 requesting a link key from terminal host 704, and access point host 704 providing a link key to short-range wireless module 702.

Network interface 708 provides connectivity to a data network infrastructure for enabling communication with at least one content server. For instance, in the context of FIGS. 1 and 5, network interface 708 provides connectivity to gateways 112 and 112', respectively. Alternatively, network interface 708 may provide direct connectivity to data network 114.

As shown in FIG. 7, processor 710 overlaps with short-range communications module 702, access point host 704, and network interface 708. This overlapping shows that functions performed by these elements may be handled by processor 710. Processor 710 and memory 706 may be implemented as described below with reference to FIG. 9. For example, processor 710 may be a commercially available microprocessor.

Memory 706 stores software components (e.g., instructions) that processor 710 executes to perform various operations. For example, memory 706 stores software components that enable the access point to handle communications with content server 116 according to protocols, such as WAP and HTTP.

In addition, memory 706 stores software instructions that allow access point host 704 to perform various features of the present invention. For example, these instructions provide for host 704 to receive WCD-originated resource requests through short-range wireless module 702. Once such a request is received, these instructions allow host 704 to add information to the resource request, such as location indicators. Then, the instructions allow host 704 to forward the resource request including the added location information to a content server, such as content server 116. The request is forwarded through network interface 708.

These location indicators are based on the location of the access point. An access point may be assigned a location indicator through information it receives during an initialization process or automatically. Alternatively, an access point may determine its location indicator through services, such as the global positioning system (GPS).

Accordingly the access point implementation of FIG. 7 may perform techniques of the present invention. For example, this implementation may perform the aforementioned operations of the host controller 110, as described above with reference to FIGS. 4A and 4B.

VII. Shopping Mall Scenario

Figure 8:
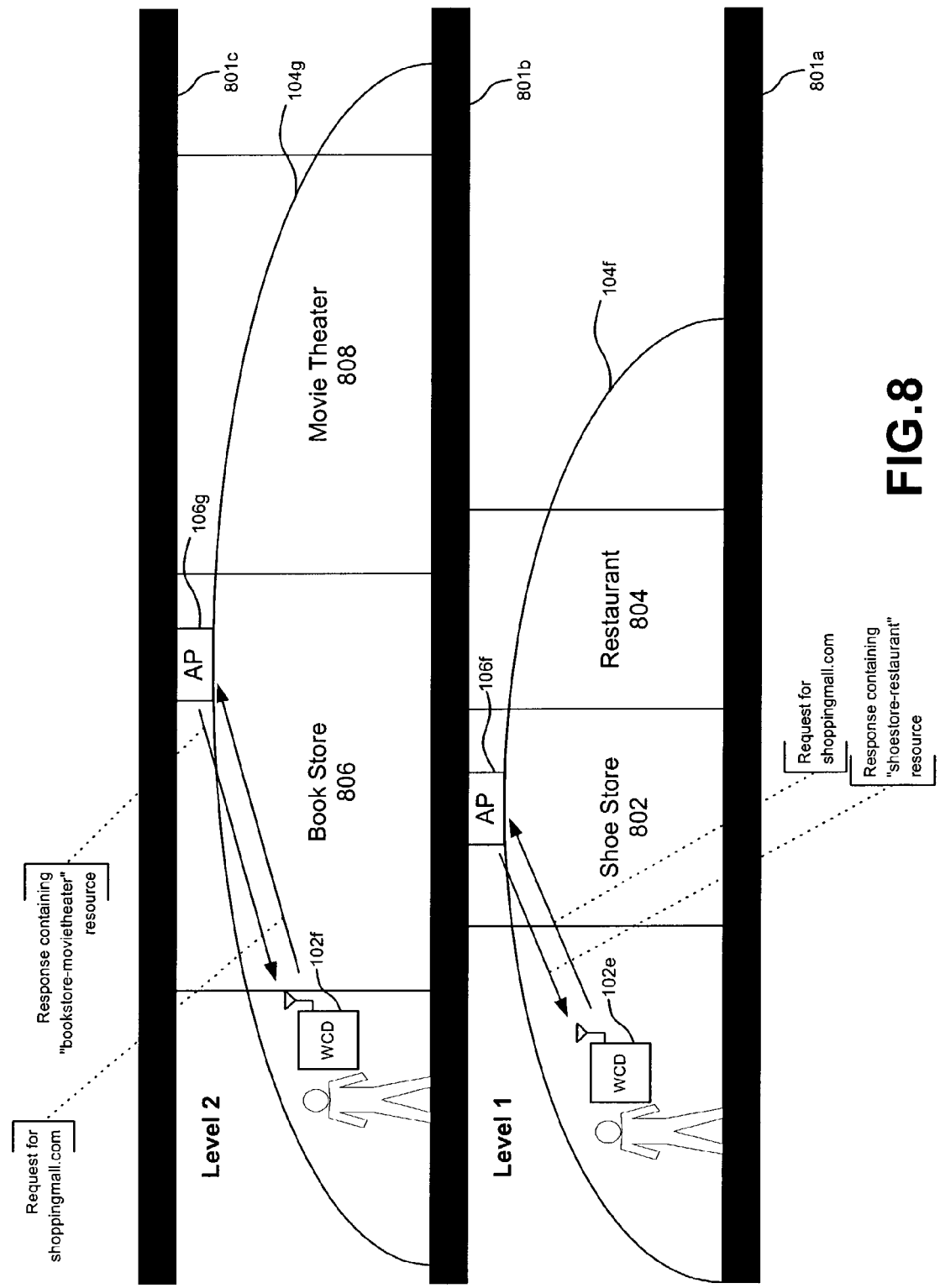
FIG. 8 is an elevation view of a scenario where two access points are located on different levels of a shopping mall according to an embodiment of the present invention.

FIG. 8 is an elevation view of a scenario where two access points are located on different levels of a shopping mall. In particular, FIG. 8 shows a first level and a second level that are separated by a floor 801b. An access point 106f having a coverage area 104f is placed on the first level. Coverage area 104f encompasses a shoe store 802 and a restaurant 804. Placed on the second level is an access point 106g that has a coverage are 104g. As shown in FIG. 8, coverage area 104g encompasses a bookstore 806 and a movie theater 808.

Floor 801b is constructed of a material, such as concrete. This prevents coverage areas 104f and 104g from overlapping. Therefore, although these coverage areas laterally overlap, they each correspond to vertically distinct locations.

The scenario of FIG. 8 includes two users that are each operating a WCD. More particularly, a user on the first level is operating a WCD 102e, while a user on the second level is operating a WCD 102f. In this scenario, each of these users transmits the same request. However, because of their different locations, these users each receive different responses. This location-based content feature is provided through the techniques described above.

As shown in FIG. 8, each user transmits a request for "shoppingmall.com". The user on the first level receives a response to this request that includes a "shoestore-restaurant" resource. This is because shoe store 802 and restaurant 804 are within coverage area 104f. In contrast, the user on the second level receives a response that includes a "bookstore-movietheater" resource. These resources may each be hypertext documents, such as WML or HTML documents.

IX. Computer System

As described above, various elements may be implemented with one or more computer systems. These elements include access points 106, host controller 110, gateways 112 and 112', content server 116, DHCP server 502, and connection manager server 504. An example of a computer system 901 is shown in FIG. 9.

Computer system 901 represents any single or multi-processor computer. Single-threaded and multi-threaded computers can be used. Unified or distributed memory systems can be used. Computer system 901 includes one or more processors, such as processor 904. One or more processors 904 can execute software implementing the processes described above. Each processor 904 is connected to a communication infrastructure 902 (for example, a communications bus, cross-bar, or network). Various software embodiments are described in terms of this exemplary computer system. After reading this description, it will become apparent to a person skilled in the relevant art how to implement the invention using other computer systems and/or computer architectures.

Computer system 901 also includes a main memory 907, which is preferably random access memory (RAM). Computer system 901 may also include a secondary memory 908. Secondary memory 908 may include, for example, a hard disk drive 910 and/or a removable storage drive 912, representing a floppy disk drive, a magnetic tape drive, an optical disk drive, etc. Removable storage drive 912 reads from and/or writes to a removable storage unit 914 in a well known manner. Removable storage unit 914 represents a floppy disk, magnetic tape, optical disk, etc., which is read by and written to by removable storage drive 912. As will be appreciated, the removable storage unit 914 includes a computer useable storage medium having stored therein computer software and/or data.

In alternative embodiments, secondary memory 908 may include other similar means for allowing computer programs or other instructions to be loaded into computer system 901. Such means can include, for example, a removable storage unit 922 and an interface 920. Examples can include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 901.

Computer system 901 may also include a communications interface 924. Communications interface 924 allows software and data to be transferred between computer system 901 and external devices via communications path 927. Examples of communications interface 927 include a modem, a network interface (such as Ethernet card), a communications port, etc. Software and data transferred via communications interface 927 are in the form of signals 928 which can be electronic, electromagnetic, optical or other signals capable of being received by communications interface 924, via communications path 927. Note that communications interface 924 provides a means by which computer system 901 can interface to a network such as the Internet.

The present invention can be implemented using software running (that is, executing) in an environment similar to that described above with respect to FIG. 9. In this document, the term "computer program product" is used to generally refer to removable storage units 914 and 922, a hard disk installed in hard disk drive 910, or a signal carrying software over a communication path 927 (wireless link or cable) to communication interface 924. A computer useable medium can include magnetic media, optical media, or other recordable media, or media that transmits a carrier wave or other signal. These computer program products are means for providing software to computer system 901.

Computer programs (also called computer control logic) are stored in main memory 907 and/or secondary memory 908. Computer programs can also be received via communications interface 924. Such computer programs, when executed, enable the computer system 901 to perform the features of the present invention as discussed herein. In particular, the computer programs, when executed, enable the processor 904 to perform the features of the present invention. Accordingly, such computer programs represent controllers of the computer system 901.

The present invention can be implemented as control logic in software, firmware, hardware or any combination thereof. In an embodiment where the invention is implemented using software, the software may be stored in a computer program product and loaded into computer system 901 using removable storage drive 912, hard drive 910, or interface 920. Alternatively, the computer program product may be downloaded to computer system 901 over communications path 927. The control logic (software), when executed by the one or more processors 904, causes the processor(s) 904 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s).

X. Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method of obtaining location-based information services, comprising:

(a) receiving a resource request without physical location information from an access point, which is in a network of a plurality of access points, the resource request originated by a wireless communications device (WCD) located within a coverage area of the access point, the WCD communicating with the access point over a wireless short-range communications link, wherein the resource request includes a resource identifier in a form of a Uniform Resource Locator (URL) and an access point identifier appended by the access point, the access point identifier distinguishing the access point from other ones of the plurality of access points in the network;

b) accessing a location manager database remote from the access point, said location manager database maintaining an association between a physical location of the access point and the access point identifier, to determine the physical location of the access point that corresponds with the received access point identifier the physical location being assigned to the WCD communicating with the access point, as representing the physical location of the WCD;

c) appending the physical location at the location manager database, into the URL of the resource request; and d) forwarding the appended resource request to a data network for receipt by a content server identified by the URL.

2. The method of claim 1, wherein the physical location includes location coordinates.

3. The method of claim 1, wherein the resource request is a hypertext transfer protocol (HTTP) request.

4. The method of claim 1, wherein the physical location further indicates a vertical position of the WCD.

5. The method of claim 1, wherein said step (b) comprises selectively appending the physical location to the resource request when the resource request identifies a suitable destination domain.

6. The method of claim 1, wherein said step (b) comprises selectively appending the physical location to the resource request when the resource request is originated by one or more predetermined WCDs.

7. The method of claim 1, further comprising adding user profile information to the resource request.

8. The method of claim 1, further comprising adding a device class of the WCD to the resource request.

9. The method of claim 1, further comprising adding an address of the WCD to the resource request.

10. The method of claim 1, wherein the resource request is a wireless application protocol (WAP) request.

11. The method of claim 1, wherein the WCD communicates with the access point across a Bluetooth wireless communications link.

12. The method of claim 1, wherein said appending step includes inserting the physical location into the resource request as one or more headers of the resource request.

13. The method of claim 12, wherein said inserting step includes inserting the physical location into the resource request as one or more extension headers.

14. The method of claim 1, wherein the resource request includes a data network address of the WCD, the data network address associated with a data network; and wherein the method further comprises:
   obtaining the physical location of the communications module from the data network address based on:
      a stored correspondence between the data network address of the WCD and a short-range network address of the WCD,
      a stored correspondence between the access point and the short-range network address of the WCD, and
      a stored correspondence between the physical location of the communications module and the access point.

15. The method of claim 14, further comprising:
   storing the correspondence between the data network address of the WCD and a short-range network address of the WCD;
   storing the correspondence between the access point and the short-range network address of the WCD; and
   storing the correspondence between the physical location of the communications module and the access point.

16. The method of claim 14, wherein said obtaining step comprises transmitting a request to a server across the data network.

17. The method of claim 14, wherein the data network address is an Internet Protocol (IP) address.

18. The method of claim 14, wherein the short-range network address is a Bluetooth device address ($BD_{13}$ ADDR).

19. An apparatus comprising:
   a location manager database that stores physical locations for short-range wireless communications devices (WCDs), wherein the physical location for each WCD is determined from a predetermined physical location of an access point remote from the location manager database, that supports a wireless connection with the WCD, the access point being in a network of a plurality of access points, said location manager database maintaining an association between a physical location of the access point and an access point identifier, to determine the physical location of the access point;
   a communications interface coupled to the location manager database and coupled to said network of a plurality of access points, for receiving resource requests without physical location information from said access point, the resource requests originated by one of said WCDs located within a coverage area of said access point, wherein the resource requests include a resource identifier in a form of a Uniform Resource Locator (URL) and an access point identifier appended by said access point, the access point identifier distinguishing the access point from other ones of the plurality of access points in the network;
   a location appending unit coupled to the location manager database configured to receive said resource requests, and for each request, to add the physical location that corresponds to the requesting WCD, wherein the location appending unit is further configured to insert the physical locations into said Uniform Resource Locators (URLs)
   said remote location manager database assigning the physical location of the access point as the physical location of the WCD.

20. The apparatus of claim 19, wherein the location manager database stores the physical locations s as location coordinates.

21. The apparatus of claim 19, wherein the resource requests are hypertext transfer protocol (HTTP) requests.

22. The apparatus of claim 19, wherein the physical locations further indicate vertical positions of the WCDs.

23. The apparatus of claim 19, wherein the location appending unit is configured to selectively add physical locations to resource requests that identify suitable destination domains.

24. The apparatus of claim 19, wherein the location appending unit is configured to selectively add physical locations to resource requests that are originated by one or more predetermined WCDs.

25. The apparatus of claim 19, wherein the location appending unit is further configured to add user profile information to the resource requests.

26. The apparatus of claim 19, wherein the location appending unit is further configured to add WCD device classes to the resource requests.

27. The apparatus of claim 19, wherein the location appending unit is further configured to add WCD device addresses to the resource requests.

28. The apparatus of claim 19, wherein the resource requests are wireless application protocol (WAP) requests.

29. The apparatus of claim 19, wherein the location appending unit is further configured to insert the physical locations into the resource requests as one or more headers of the request.

30. The apparatus of claim 29, wherein the location appending unit is further configured to insert the physical locations into the URLs as one or more extension headers of the requests.

31. A system for obtaining location-based information services, comprising:
   means for receiving a resource request without physical location information from an access point, which is in a network of a plurality of access points, the resource request originated by a wireless communications device (WCD) located within a coverage area of the access point, the WCD communicating with the access point over a wireless short-range communications link, wherein the resource request includes a resource identifier in a form of a Uniform Resource Locator (URL) and an access point identifier appended by the access point, the access point identifier distinguishing the access point from other ones of the plurality of access points in the network;
   means for accessing a location manager database remote from the access point, said location manager database maintaining an association between a physical location of the access point and the access point identifier, to determine the physical location of the access point that corresponds with the received access point identifier and identifies a physical location of the access point with which the WCD is communicating;
   means for appending the physical location into the URL of the resource request, and means for forwarding the appended resource request to a data network for receipt by a content server identified by the URL said remote location manager database assigning the physical location of the access point as the physical location of the WCD.

32. The system of claim 31, wherein the physical location includes location coordinates.

33. The system of claim 31, wherein the resource request is a hypertext transfer protocol (HTTP) request.

34. The system of claim 31, wherein the physical location further indicates a vertical position of the WCD.

35. The system of claim 31, wherein said means for appending comprises means for selectively adding the physical location to the resource request when the resource request identifies a suitable destination domain.

36. The system of claim 31, wherein said means for appending comprises means for selectively adding the physical location to the resource request when the resource request is originated by one or more predetermined WCDs.

37. The system of claim 31, further comprising means for adding user profile information to the resource request.

38. The system of claim 31, further comprising means for adding a device class of the WCD to the resource request.

39. The system of claim 31, further comprising means for adding a device address of the WCD to the resource request.

40. The system of claim 31, wherein the resource request is a wireless application protocol (WAP) request.

41. The system of claim 31, wherein the resource request includes a data network address of the WCD, the data network address associated with a data network; and wherein the system further comprises:

means for obtaining the physical location of the communications module from the data network address based on:
 a stored correspondence between the data network address of the WCD and a short-range network address of the WCD,
 a stored correspondence between the access point and the short-range network address of the WCD, and
 a stored correspondence between the physical location of the communications module and the access point.

42. The system of claim 31, wherein said means for appending includes means for inserting the physical location into the resource request as one or more headers of the resource request.

43. The system of claim 42, wherein the one or more headers are extension headers.

44. A computer program product comprising a computer useable medium having computer program logic recorded thereon for enabling a processor in a computer system to obtain location based services, the computer program logic comprising:

program code for enabling the processor to receive a resource request without physical location information from an access point, which is in a network of a plurality of access points, the resource request originated by a wireless communications device (WCD) located within a coverage area of the access point, the WCD communicating with the access point over a wireless short-range communications link, wherein the resource request includes a resource identifier in a form of a Uniform Resource Locator (URL) and an access point identifier appended by the access point, the access point identifier distinguishing the access point from other ones of the plurality of access points in the network;

program code for enabling the processor to access a location manager database remote from the access point, said location manager database maintaining an association between a physical location of the access point and the access point identifier, to determine the physical location of the access point that corresponds with the received access point identifier and identifies a physical location of the access point with which the WCD is communicating;

program code for enabling the processor to append the physical location into the URL of the resource request; and program code for enabling the processor to forward the appended resource request to a data network for receipt by a content server identified by the URL said remote location manager database assigning the physical location of the access point as the physical location of the WCD.

45. The computer program product of claim 44, wherein the resource request includes a data network address of the WCD, the data network address associated with a data network; and wherein the system further comprises:

program code for enabling the processor to obtain the physical location of the communications module from the data network address based on:
 a stored correspondence between the data network address of the WCD and a short-range network address of the WCD,
 a stored correspondence between the access point and the short-range network address of the WCD, and
 a stored correspondence between the physical location of the communications module and the access point.

46. An apparatus for providing location-based services, comprising:

a short-range wireless communications module for communicating with wireless communications devices (WCDs), the short-range wireless communications module being in a data network infrastructure of a plurality of short-range wireless communications modules;

a network interface coupled to the data network infrastructure for enabling communication with at least one content server;

a memory;

a processor that executes instructions stored in the memory for:

receiving a resource request without physical location information originated by a WCD through the shod-range wireless communications module wherein the resource request includes a resource identifier in a form of a Uniform Resource Locator (URL) and a communications module identifier appended by the shod-range wireless communications module, the communications module identifier distinguishing the communications module from other ones of the plurality of communications modules in the network;

accessing a location manager database remote from the communications moduel, said location manager database maintaining an association between a physical location of the communications module and the communications module identifier, to determine a physical location of the communications module that corresponds with the received communications module identifier;

adding to the resource request the physical location that identifies a location of the WCD by inserting the physical location into a Uniform Resource Locator (URL) of the resource request, wherein the physical location is based on a location of the apparatus; and forwarding the resource request including the added location information to a content server through the network interface said remote location manager database assigning the physical location of the access point as the physical location of the WCD.

47. The apparatus of claim 46, wherein the resource request includes a data network address of the WCD, the data network address associated with a data network; and wherein the processor further executes instructions stored in the memory for:

obtaining the physical location of the communications module from the data network address based on:

a stored correspondence between the data network address of the WCD and a short-range network address of the WCD, a stored correspondence between the access point and the short-range network address of the WCD, and a stored correspondence between the physical location of the communications module and the access point.

48. A method, comprising:

(a) receiving a resource request without physical location information originated by a short-range wireless communications device (WCD);

(b) forwarding the resource request to a content server;

(c) receiving from the content server an instruction for a location indicator that identifies a location of the WCD;

(d) determining the location indicator based on a location of an access point that is in communication with the WCD over a short-range communications link, the access point being in a network of a plurality of access points, and wherein said resource request includes a resource identifier in a form of a Uniform Resource Locator (URL) and an access point identifier appended by the access point, the access point identifier distinguishing the access point from other ones of the plurality of access points in the network;

(e) accessing a location manager database remote from the access point, said location manager database maintaining an association between a physical location of the communications module and the communications module identifier, to determine a physical location of the communications module that corresponds with the received access point identifier; and (f) in response to the instruction, sending the physical location of the communications module to the content server;

said remote location manager database assigning the physical location of the access point as the physical location of the WCD.

49. The method of claim 48, wherein the resource request includes a data network address of the WCD, the data network address associated with a data network; and wherein the method further comprises:

obtaining the physical location of the communications module from the data network address based on:

a stored correspondence between the data network address of the WCD and a short-range network address of the WCD, a stored correspondence between the access point and the short-range network address of the WCD, and a stored correspondence between the physical location of the communications module and the access point.

50. The method of claim 49, further comprising:

storing the correspondence between the data network address of the WCD and a short-range network address of the WCD;

storing the correspondence between the access point and the short-range network address of the WCD; and storing the correspondence between the physical location of the communications module and the access point.

51. The method of claim 49, wherein step (e) comprises sending the physical location of the communications module to the content server across the data network.

52. An apparatus, comprising:

a short-range wireless communications module for communicating with wireless communications devices (WCDs), the short-range wireless communications module being in a data network infrastructure of a plurality of short-range wireless communications modules;

a network interface coupled to the data network infrastructure for enabling communication with at least one content server;

a memory;

a processor that executes instructions stored in the memory for:

receiving a resource request without physical location information originated by a short-range wireless communications device (WCD);

forwarding the resource request to a content server;

receiving from the content server an instruction for a location indicator that identifies a location of the WCD;

determining the location indicator based on a location of the short-range wireless communications module, which is in communication with the WCD across a short-range network, wherein the resource request includes a resource identifier in a form of a Uniform Resource Locator (URL) and a communications module identifier appended by the short-range wireless communications module, the communications module identifier distinguishing the communications module from other ones of the plurality of communications modules in the network;

accessing a location manager database remote from the communications modules, said location manager database maintaining an association between a physical location of the communications module and the communications module identifier, to determine a physical location of the communications module a that corresponds with the received access point identifier; and in response to the instruction, sending the physical location of the communications module to the content server;

said remote location manager database assigning the physical location of the access point as the physical location of the WCD.

* * * * *